United States Patent
Tano et al.

(10) Patent No.: US 9,804,037 B2
(45) Date of Patent: Oct. 31, 2017

(54) DIAGNOSTIC APPARATUS FOR TEMPERATURE SENSOR

(71) Applicant: MITSUBISHI JIDOSHA KOGYO KABUSHIKI KAISHA, Tokyo (JP)

(72) Inventors: Shoya Tano, Tokyo (JP); Hideo Matsunaga, Tokyo (JP); Junya Kitada, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/058,306

(22) Filed: Mar. 2, 2016

(65) Prior Publication Data

US 2016/0273975 A1 Sep. 22, 2016

(30) Foreign Application Priority Data

Mar. 20, 2015 (JP) ................... 2015-058340

(51) Int. Cl.
*G01M 17/00* (2006.01)
*G01K 15/00* (2006.01)

(52) U.S. Cl.
CPC ....... *G01K 15/007* (2013.01); *G01K 2205/00* (2013.01)

(58) Field of Classification Search
CPC .... G01K 15/007; G01K 2205/00; G01D 3/08; B60T 17/221; B60T 2250/06; B60T 8/172; G01P 21/00
USPC ............................................. 701/29.7; 374/4
See application file for complete search history.

(56) References Cited

U.S. PATENT DOCUMENTS

| | | | |
|---|---|---|---|
| 9,004,751 B2 | 4/2015 | Sakurada | |
| 2011/0011378 A1* | 1/2011 | Nakamura | F02M 26/49 123/568.16 |
| 2013/0041570 A1* | 2/2013 | Sekine | F02D 41/22 701/102 |
| 2013/0058373 A1* | 3/2013 | Sakurada | F02D 41/222 374/4 |
| 2014/0202147 A1* | 7/2014 | Woodsum | F02G 1/043 60/517 |
| 2015/0090230 A1* | 4/2015 | Bolz | F02D 41/0085 123/480 |
| 2015/0114339 A1* | 4/2015 | Sellnau | F02N 19/04 123/294 |

FOREIGN PATENT DOCUMENTS

JP 5531776 B2 6/2014

* cited by examiner

*Primary Examiner* — Shardul Patel
(74) *Attorney, Agent, or Firm* — Birch, Stewart, Kolasch & Birch, LLP (57) ABSTRACT

A first temperature sensor measures a first temperature of an object related to an engine. A fuel temperature sensor measures a fuel temperature. A diagnostic apparatus includes a diagnostic unit diagnosing the first temperature sensor based at least in part on the first temperature measured at the first temperature sensor. The diagnostic apparatus also includes a first determining unit determining whether the state of fault of the first temperature sensor is unclear or not based at least in part on the variation in the fuel temperature after the start-up of the engine for the diagnosis at the diagnostic unit.

16 Claims, 5 Drawing Sheets

DIAGNOSTIC APPARATUS FOR TEMPERATURE SENSOR

CROSS-REFERENCE TO THE RELATED APPLICATION

This application incorporates by references the subject matter of Application No. 2015-058340 filed in Japan on Mar. 20, 2015 on which a priority claim is based under 35 U.S.C. §119(a).

FIELD

The present invention relates to a diagnostic apparatus for a temperature sensor.

BACKGROUND

A typical method for diagnosing a temperature sensor mounted in a vehicle utilizes temperatures of different sites of an engine in a thermal equilibrium state. Temperatures are measured with temperature sensors at the start-up of the engine after a long parking period. The difference between the measured temperatures outside a normal range indicates the presence of a fault in the diagnosed temperature sensor (See Japanese Patent No. 5,531,776).

"A thermal equilibrium state" here refers to the condition of the engine at substantially equal temperatures at different sites with substantially no or slight heat transfer between these sites. If several to about fifteen hours elapse after the shut-off of the engine (the elapsed time is referred to as a soak time or an engine shut-off time), the temperatures at the different sites of the engine approach the ambient temperature and thus these site are in a thermal equilibrium state. The measurement of temperature in a thermal equilibrium state is not affected by the draft cooling of the engine nor the heat generated in the engine while the vehicle is running. The comparison of the difference between the measured temperatures with the normal range enables a reliable diagnosis.

The methods for determining the thermal equilibrium state of an engine are categorized into measurement of the elapsed time between the shut-off of the engine and the start-up of the engine (first method) and comparison of the temperatures at different sites of the engine at the start-up of the engine (second method).

In the first method, the elapsed time after the shut-off of the engine is measured by a soak timer. When the elapsed time exceeds a predetermined time, the engine is determined to be in a thermal equilibrium state. For example, when the elapsed time is eight hours or more, the engine may be determined to be in a thermal equilibrium state. A vehicle without a soak timer operable during the shut-off time, however, cannot measure the elapsed time. The vehicle with the soak timer cannot obtain high-accuracy diagnostic results since the first method depends on a single fixed reference value. The time until the engine reaches a thermal equilibrium state varies depending on several conditions, such as temperatures at different sites of the shut-off engine (initial temperatures) and the ambient temperature during the shut-off time (a convergent temperature).

In the second method, temperatures at different sites of the engine are measured by temperature sensors at the start-up of the engine (at the turn-on of the main switch). A small difference between the measured temperatures determines that the engine is in a thermal equilibrium state. Both the temperature of cooling water for the engine measured with a water temperature sensor and the temperature of the engine oil measured with an oil temperature sensor are close to the ambient temperature after the engine reaches a thermal equilibrium state. A small difference between the water temperature and the oil temperature determines that the engine is in a thermal equilibrium state. This method can be applied to a vehicle without a soak timer.

If a vehicle is parked in bad weather in a cold region and is cooled rapidly, however, the water temperature and the oil temperature may drop to have a small difference therebetween before the engine reaches a thermal equilibrium state. As a result, the engine may be erroneously determined to be in a thermal equilibrium state even if the actual elapsed time from the shut-off of the engine is significantly short (tens of minutes, for example). The diagnosis of a temperature sensor based on the erroneous determination, using the measured temperatures affected by the heat of the engine, leads to inaccurate diagnostic results.

SUMMARY

Technical Problems

An object of the present invention, which has been made to solve the above problem, is to provide a high-accuracy diagnostic apparatus for a temperature sensor. The present invention may include any other object for providing advantageous effects, which can be achieved by each element of "the embodiment of the present invention" described below and have not been achieved by conventional technologies.

Solution to Problems (1) The diagnostic apparatus for a temperature sensor disclosed herein diagnoses a temperature sensor mounted in a vehicle. The diagnostic apparatus includes a first temperature sensor and a fuel temperature sensor. The first temperature sensor measures a first temperature of an object related to an engine in the vehicle. The fuel temperature sensor measures a fuel temperature in the vehicle. The fuel temperature is different from the first temperature.

The diagnostic apparatus includes a diagnostic unit diagnosing the first temperature sensor based at least in part on the first temperature measured at the first temperature sensor at a start-up of the engine. The diagnostic apparatus also includes a first determining unit determining whether the state of fault of the first temperature sensor is unclear or not based at least in part on a variation in the fuel temperature measured at the fuel temperature sensor after the start-up of the engine for the diagnosis at the diagnostic unit.

"The state of fault of the first temperature sensor is unclear" here refers to a condition of the diagnostic apparatus that cannot determine whether the first temperature sensor is normal or not.

"The temperature of an object related to the engine" may be the intake temperature, the temperature of cooling water for the engine, the temperature of engine oil, the temperature in the engine room, the temperature of a cylinder block, and the temperature of a cylinder head. "The variation in the fuel temperature" includes both "an increment" and "a decrement." The fuel temperature sensor is not subject to the diagnosis at the diagnostic unit.

(2) Preferably, the first determining unit determines the state of fault of the first temperature sensor to be unclear if an increment in the fuel temperature is equal to or greater than a first threshold, and determines that a fault of the first temperature sensor is present if the increment in the fuel temperature is less than the first threshold. "The increment" and "the first threshold" here are positive values.

(3) Preferably, the first determining unit calculates the increment in the fuel temperature until an elapsed time after the start-up of the engine reaches a first determination time.

(4) Preferably, the first determining unit determines the state of fault of the first temperature sensor to be unclear if a decrement in the fuel temperature is less than a second threshold, and determines that a fault of the first temperature sensor is present if the decrement in the fuel temperature is equal to or greater than the second threshold. "The decrement" and "the second threshold" here are negative values.

(5) Preferably, the first determining unit calculates the decrement in the fuel temperature from a temperature at which the fuel temperature starts to decrease, that is, the maximum point on the curve indicating the variation in the fuel temperature over time.

(6) Preferably, the first determining unit calculates the variation in the fuel temperature while the vehicle is running.

(7) Preferably, the first determining unit calculates the variation in the fuel temperature at a vehicle speed equal to or higher than a criterial vehicle speed until a cumulative running time reaches a criterial time.

(8) Preferably, the diagnostic apparatus for a temperature sensor includes a presuming unit estimating a thermal equilibrium state in the engine. Preferably, the first determining unit determines the state of fault of the first temperature sensor based at least in part on the variation in the fuel temperature if the presuming unit determines that the engine is in a thermal equilibrium state.

(9) Preferably, the presuming unit determines that the engine is in a thermal equilibrium state if the difference between a temperature of cooling water for the engine and the fuel temperature is within a criterial range.

(10) Preferably, the diagnostic apparatus for a temperature sensor includes a second temperature sensor measuring a second temperature of another object related to the engine, the second temperature being different from the first temperature and the fuel temperature, and a second determining unit determining a difference between the first temperature measured at the first temperature sensor and the second temperature measured at the second temperature sensor. Preferably, the first determining unit determines the state of fault of the first temperature sensor to be unclear based at least in part on the variation in the fuel temperature if the second determining unit determines that the difference is outside a criterial range.

(11) Preferably, the first determining unit determines the state of fault of the first temperature sensor based at least in part on the variation in the fuel temperature if the second determining unit determines that the difference remains outside the criterial range for a second determination time or more.

(12) Preferably, the first threshold is set larger than the second threshold.

Advantageous Effects

The disclosed diagnostic apparatus for a temperature sensor improves the diagnostic accuracy in diagnosing the temperature sensor.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

The diagnostic apparatus for a temperature sensor according to the present embodiment will now be described with reference to the accompanying drawings. The following embodiment is merely illustrative and not construed to exclude any other modification or application not illustrated in the following description. Any modification, elimination, or combination can be made on the elements of the present embodiment within the scope of the present invention as appropriate.

[1. Structure Of Apparatus]

Figure 1:
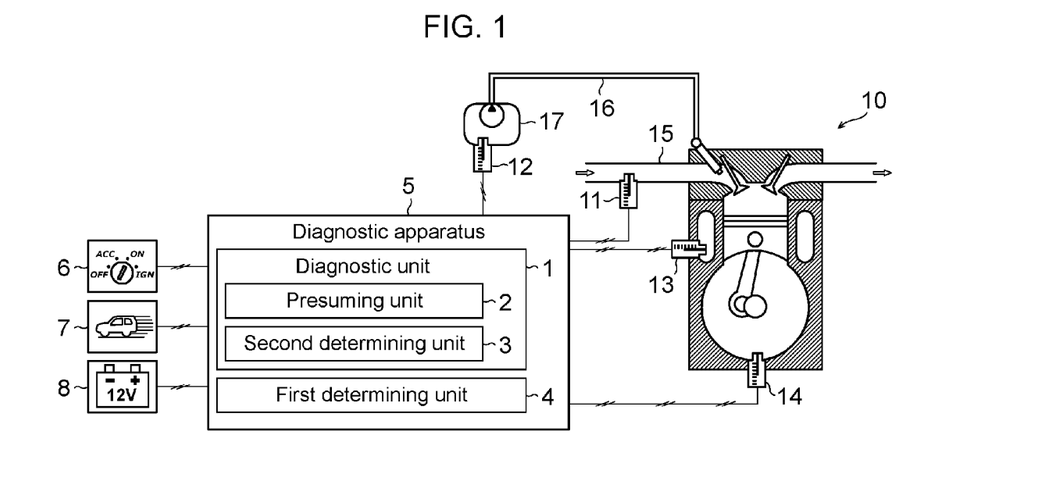
FIG. 1 is a schematic diagram illustrating an engine provided with the diagnostic apparatus according to the present embodiment.

FIG. 1 illustrates an engine 10 (an internal combustion engine, such as a gasoline engine and a diesel engine) in a vehicle. The engine 10 includes an intake temperature sensor 11, a fuel temperature sensor 12, a water temperature sensor 13, and an oil temperature sensor 14. The intake temperature sensor 11 measures the temperature in an intake passage 15 (an intake temperature AT). The fuel temperature sensor 12 measures the temperature in a fuel passage 16 or a fuel tank 17 (a fuel temperature FT). The water temperature sensor 13 measures the temperature of cooling water for the engine (a water temperature WT). The oil temperature sensor 14 measures the temperature of engine oil (an oil temperature OT). The information on the temperatures measured at these temperature sensors 11 to 14 is sent to a diagnostic apparatus 5. Any one of these temperature sensors 11, 13, and 14 other than the fuel temperature sensor 12 may be a first temperature sensor measuring a first temperature of an object related to the engine 10 (an engine-related temperature, which is correlated with the temperature of the engine 10). Any one of these temperature sensors 11, 13, and 14 other than the fuel temperature sensor 12 may be also a second temperature sensor measuring a second temperature of another object related to the engine 10. The second temperature is different from the first temperature and the fuel temperature.

The vehicle includes a vehicle speed sensor 7 measuring a vehicle speed S, and a voltage sensor 8 measuring a battery voltage V. The vehicle speed sensor 7 is mounted on a driveline between a power train and a driving wheel, or on a wheel. The voltage sensor 8 is mounted on a battery, or disposed between the battery and a circuit. The information on the vehicle speed S measured at the sensor 7, and the battery voltage V measured at the sensor 8 is sent to the diagnostic apparatus 5. The information on the vehicle speed S is used to determine whether the vehicle is running or not.

In the cabin, the vehicle includes an ignition key switch 6 (an IG switch 6) outputting IG signals for turning on/off the main power supply of the vehicle, and triggering the start-up of the engine 10. The IG switch 6 has four operational positions: an "off" position (OFF), an "accessory" position (ACC), an "on" position (ON), and an "ignition" position (IGN).

The main power supply of the vehicle is turned off at the "off" position. The accessories of the vehicle other than the driving devices for the engine 10 are activated at the "accessory" position. At these positions, the engine 10 is in a shut-off mode. At the "ignition" position, IG signals are supplied to an engine controller to activate a starter for starting up the engine 10. The operational position then automatically switches from the "ignition" position to the "on" position, so that all the accessories are activated during the operation of the engine 10. In the present embodiment, the IG signals are also sent to the diagnostic apparatus 5.

The diagnostic apparatus 5 is an electronic controller for diagnosing a temperature sensor. The diagnostic apparatus 5 diagnoses any temperature sensor measuring a temperature of an object related to the engine 10. At least the temperature sensors 11, 13, and 14 other than the fuel temperature sensor 12 may be subject to the diagnosis. The diagnostic apparatus 5 diagnoses any one of these sensors at every start-up of the engine 10. In the following description of the present embodiment, the process for diagnosing the intake temperature sensor 11 at the start-up of the engine 10 with the IG switch 6 will now be described in detail.

The diagnostic apparatus 5 is an electronic device including a microprocessor such as a central processing unit (CPU), a micro processing unit (MPU), and memories such as a read only memory (ROM), a random access memory (RAM), and a nonvolatile memory. The microprocessor includes a control unit (a control circuit), an arithmetic unit (an arithmetic circuit), and a cache memory (registers). The ROM, RAM, and nonvolatile memory store programs and data under process.

FIG. 1 includes a block diagram for explanation of the diagnostic program for the diagnostic process performed at the microprocessor in the diagnostic apparatus 5. This application program is stored in the ROM, RAM, nonvolatile memory, or a removable medium. The program is expanded in a memory space in the RAM and executed by the microprocessor. The diagnostic apparatus 5 includes a diagnostic unit 1 and a first determining unit 4 for diagnosing the intake temperature sensor 11. The diagnostic unit 1 includes a presuming unit 2 and a second determining unit 3.

[2. Diagnostic Process]

The diagnostic unit 1 diagnoses anyone of the temperature sensors 11 to 14 based on (based at least in part on) the temperatures measured at the temperature sensors 11 to 14 at the start-up of the engine 10. The diagnostic process starts when the IG switch 6 is switched to the "ignition" position (an IG-ON operation is carried out). The diagnostic process takes place every time the driver starts up the engine 10 with the IG switch 6. In the following description, the intake temperature sensor 11 will be subject to the diagnosis at the diagnostic unit 1.

If the engine 10 is in a thermal equilibrium state, and if the difference between the intake temperature AT and any other temperature (any one of the water temperature WT, the oil temperature OT, and the fuel temperature FT, for example) is within a criterial range (that is, the difference is small), the intake temperature sensor 11 is determined to be normal. The conditions indicating the thermal equilibrium state in the engine 10 are referred to as "soak conditions". The conditions indicating a large difference are referred to as "large-difference conditions", while the conditions indicating a small difference are referred to as "small-difference conditions".

The soak conditions are determined at the presuming unit 2. The large-difference conditions (or the small-difference conditions) are determined at the second determining unit 3. If the soak conditions and the small-difference conditions are satisfied (the large-difference conditions are not satisfied), the diagnostic unit 1 determines that the intake temperature sensor 11 is normal (the intake temperature sensor 11 has no fault). If the soak conditions are not satisfied, which indicates that the intake temperature AT is not close enough to the other temperature, the diagnostic unit 1 determines the state of fault of the intake air temperature sensor 11 to be unclear (the diagnostic unit 1 cannot determine whether the intake temperature sensor 11 is normal or not).

In situations that the vehicle is parked in bad weather in a cold region and cooled rapidly, the small-difference conditions may not be satisfied even if the soak conditions are satisfied, resulting in an inaccurate diagnosis of the intake temperature sensor 11. Variations in temperatures over time after the shut-off of the engine 10 will now be described with reference to FIGS. 2(A) and 2(B).

Figure 2A:
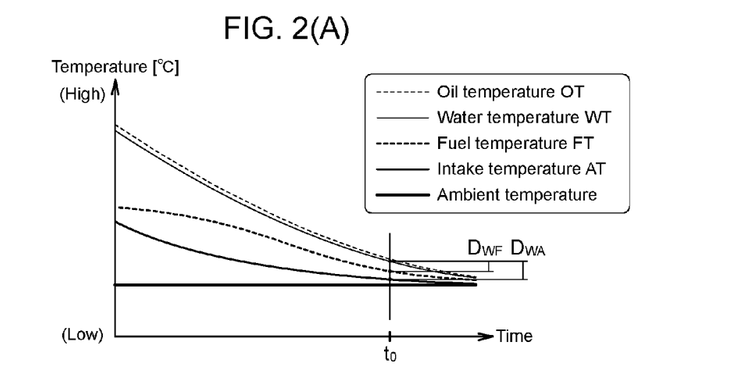
FIG. 2(A) is a graph indicating variations in temperatures at different sites over time after the shut-off of the engine under a normal cooling condition.
Figure 2B:
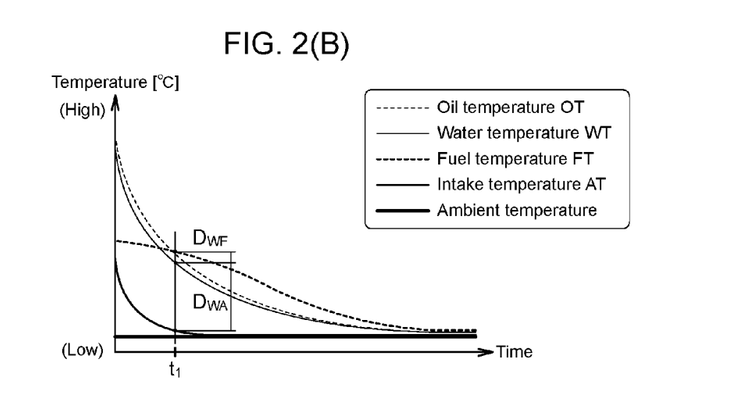
FIG. 2(B) is a graph indicating variations in temperatures at different sites over time after the shut-off of the engine under a rapid cooling condition.

FIG. 2(A) illustrates the variations in temperatures at different sites (the oil temperature OT, the water temperature WT, the fuel temperature FT, the intake temperature AT, and the ambient temperature) over time after the shut-off of the engine 10 under a normal cooling condition. FIG. 2(B) illustrates the variations in temperatures at different sites over time after the shut-off of the engine 10 under a rapid cooling condition (in bad weather in a cold region).

Under the normal cooling condition, the drops in these temperatures correspond to their initial temperatures. After a certain period of soak time elapses, around a time to, almost all the temperatures are close to the ambient temperature. As shown in FIG. 2(A), at the substantially small difference $D_{WF}$ between the water temperature WT and the fuel temperature FT, the difference $D_{WA}$ between the water temperature WT and the intake temperature AT is also small. This enables an accurate diagnosis of the intake temperature sensor 11.

Under the rapid cooling condition, the intake temperature AT, the water temperature WT, and the oil temperature OT rapidly drop, while the fuel temperature FT slowly decreases. As shown in FIG. 2(B), at a time t1, the difference $D_{WF}$ between the water temperature WT and the fuel temperature FT is substantially small, while the difference $D_{WA}$ between the water temperature WT and the intake temperature AT is still large. Under this condition, it is difficult to determine whether the intake temperature sensor 11 is normal or not.

In the present embodiment, the condition of the intake temperature sensor 11 is estimated with reference to a variation (an increment or a decrement) in the fuel temperature FT after the start-up of the engine 10 for the diagnosis at the diagnostic unit 1. The first determining unit 4 performs the determination based on (based at least in part on) the variation in the fuel temperature FT.

The fuel temperature FT varies depending on the position of the mounted fuel temperature sensor 12 on the fuel tank 17. The fuel temperature FT is relatively low at the fuel temperature sensor 12 mounted on the lower part of the fuel tank 17 containing a certain amount of fuel, while the fuel temperature FT is relatively high at the fuel temperature sensor 12 mounted on the upper part of the fuel tank 17. The fuel tank 17 has layers of different fuel temperatures FT, which causes such a large difference between the fuel temperatures FT in the fuel tank 17.

The fuel in the fuel tank 17 is agitated after the start-up of the engine 10, which agitation uniformalizes the distribution of the fuel temperatures FT in the fuel tank 17. As a result, the fuel temperature FT at the fuel temperature sensor 12 mounted on the lower part of the fuel tank 17 rapidly rises. The rapid rise in the fuel temperature FT after the start-up of the engine 10 indicates that the engine 10 has experienced a rapid cooling condition. The operation of the engine 10 uniformalizes the differences in the fuel temperatures FT. The running of the vehicle makes the agitated fuel more homogeneous and further promotes the uniformalization of the fuel temperature FT by agitation.

The fuel temperature FT at a float-type fuel temperature sensor 12 measuring the fuel temperature FT near the fuel surface is relatively high. After the start-up of the engine 10, the fuel in the fuel tank 17 is agitated and the fuel temperature FT at the fuel temperature sensor 12 rapidly drops. The rapid drop in the fuel temperature FT after the start-up of the engine 10 indicates that the engine 10 has experienced a rapid cooling condition.

The fuel temperature FT may once rapidly rise then drop depending on the position of the mounted fuel sensor 12 on the fuel tank 17. This rapid drop in the fuel temperature FT does not occur after the start-up of the engine 10 which has not experienced a rapid cooling condition. The variation in the fuel temperature FT from positive to negative thus indicates that the engine 10 has experienced a rapid cooling condition. In other words, it is presumable that the engine 10 has experienced a rapid cooling condition if the gradient value of the fuel temperature FT turns from positive to negative.

The presuming unit 2 estimates the thermal equilibrium state in the engine 10. The presuming unit 2 calculates the difference $D_{WF}$ between the water temperature WT and the fuel temperature FT and determines whether the difference $D_{WF}$ is within a criterial range or not. Alternatively, the presuming unit 2 determines whether the absolute value of the difference $D_{WF}$ is smaller than a criterial temperature difference or not. In the present embodiment, the presuming unit 2 determines whether the temperature difference $D_{WF}$ is within a criterial range $R_1$ or not. The temperature difference $D_{WF}$ is a value calculated by subtracting the fuel temperature FT from the water temperature WT ($D_{WF}$=WT−FT). The criterial range $R_1$, including 0° C., is used to determine whether the temperature difference $D_{WF}$ is relatively small or not.

For example, the criterial range $R_1$ may be from −10° C. to +10° C. If the temperature difference $D_{WF}$ is within this criterial range $R_1$, the presuming unit 2 determines that "the engine 10 is in a thermal equilibrium state (the soak conditions are satisfied)". If the temperature difference $D_{WF}$ is less than −10° C. or greater than +10° C., the presuming unit 2 determines that "the engine 10 is not in a thermal equilibrium state (soak conditions are not satisfied)". The upper limit and lower limit values of the criterial range $R_1$ may be fixed values or variable values depending on the operational condition of the engine 10. The results at the presuming unit 2 are sent to the second determining unit 3 and the first determining unit 4.

An example of soak conditions is as follows:

Condition 1: Basic conditions are satisfied.

Condition 2: An elapsed time $T_{KEY}$ from the IG-ON operation is shorter than a first criterial time $T_1$.

Condition 3: The elapsed time $T_{KEY}$ from the IG-ON operation is equal to or longer than a second criterial time $T_2$, or an elapsed time $T_{RUN}$ from the start-up of the engine is equal to or longer than the second criterial time $T_2$.

Condition 4: The temperature difference $D_{WF}$ is within the criterial range $R_1$.

Conditions 1 to 3 of these conditions can be eliminated as appropriate.

The basic conditions in condition 1 are used to determine whether the vehicle is in sufficient maintenance for a high-accuracy diagnosis. For example, the basic conditions include no disconnection in the communication system of the vehicle and normal communication of information detected at the temperature sensors 11 to 14 to the diagnostic apparatus 5. The basic conditions may further include unrecorded diagnostic trouble code (so-called "Diag code") on the temperature sensors 11 to 14 in the electronic vehicle controller, and a water temperature WT equal to or higher than a reference water temperature at the previous shut-off of the engine (when the IG switch 6 is switched to the "off" position).

In conditions 2 and 3, the first criterial time $T_1$ is longer than the second criterial time $T_2$. For example, $T_1$ may be tens of seconds, for example, about thirty seconds, and $T_2$ may be several seconds, for example, two seconds.

The second determining unit 3 determines the difference between the temperature of the target sensor and any other temperature based on (based at least in part on) the information on the temperatures measured at the temperature sensors 11 to 14. This determination is performed if the presuming unit 2 determines that the soak conditions are at least satisfied. If the target sensor is the intake temperature sensor 11, the second determining unit 3 determines the difference between the intake temperature AT and any other temperature (any one of the water temperature WT, the oil temperature OT, and the fuel temperature FT, for example).

In the case of use of the intake temperature AT and the water temperature WT, the second determining unit 3 calculates the temperature difference $D_{WA}$ by subtracting the intake temperature AT from the water temperature WT ($D_{WA}$=WT−AT). The second determining unit 3 then determines whether the temperature difference $D_{WA}$ is within a second criterial range $R_2$ or not. The second criterial range $R_2$ is used to determine whether the temperature difference $D_{WA}$ is small or not (whether the two values are close or not). The second criterial range $R_2$ includes 0° C. (from −15° C. to +15° C., for example).

If the temperature difference $D_{WA}$ is outside the second criterial range $R_2$, in other words, if the absolute value of the temperature difference $D_{WA}$ is equal to or larger than the criterial temperature difference, the second determining unit 3 determines that "the difference is large (the large-difference conditions are satisfied, but the small-difference conditions are not satisfied)". If the temperature difference $D_{WA}$ is within the second criterial range $R_2$, in other words, if the absolute value of the temperature difference $D_{WA}$ is smaller than the criterial temperature difference, the second determining unit 3 determines that "the difference is small (the large-difference conditions are not satisfied, but the small-difference conditions are satisfied)". The upper limit and lower limit values of the second criterial range $R_2$ may be fixed values or variable values depending on the operational condition of the engine 10. The results at the second determining unit 3 are sent to the first determining unit 4.

An example of large-difference conditions is as follows:

Condition 5: The basic conditions are satisfied.

Condition 6: A voltage V is equal to or higher than a criterial voltage $V_0$.

Condition 7: The elapsed time $T_{KEY}$ after the IG-ON operation is shorter than the first criterial time $T_1$.

Condition 8: The elapsed time $T_{KEY}$ after the IG-ON operation is equal to or longer than the second criterial time $T_2$, or the elapsed time $T_{RUN}$ after the start-up of the engine is equal to or longer than the second criterial time $T_2$.

Condition 9: The temperature difference $D_{WA}$ is outside the second criterial range $R_2$.

Condition 10: An elapsed time $T_{VER}$ after condition 9 is satisfied is equal to or longer than a third criterial time $T_3$ (the second determination time $T_3$).

Conditions 5 to 8, and 10 of these conditions can be eliminated as appropriate. Condition 5 is the same as condition 1. In conditions 7 and 8, the elapsed times $T_{KEY}$ and $T_{RUN}$ may be replaced by the elapsed time after the voltage V reaches and exceeds the criterial voltage $V_0$. This can determine the large-difference conditions in view of the lag time in the application of the voltage V in a low temperature environment. The third criterial time $T_3$ (the second determination time) is several seconds (two seconds, for example).

The first determining unit 4 performs the determination based on (based at least in part on) the variation (the increment or the decrement) in the fuel temperature FT for the diagnosis at the diagnostic unit 1. The conditions determined at the first determining unit 4 are referred to as "fuel temperature variation conditions". The first determining unit 4 calculates the variation $D_{FF}$ in the fuel temperature FT within a criterial time (a first determination time), and compares the variation $D_{FF}$ with a first threshold $D_1$ and a second threshold $D_2$. The first threshold $D_1$ has a positive value for determining the increment in the fuel temperature FT when the variation $D_{FF}$ is positive (the fuel temperature FT rises). The second threshold $D_2$ has a negative value for determining the decrement in the fuel temperature FT when the variation $D_{FF}$ is negative (the fuel temperature FT drops). In the present embodiment, for example, the first threshold $D_1$ is about 15° C., and the absolute value of the second threshold $D_2$ (a temperature range) is about 4° C.

Preferably, the absolute value of the first threshold $D_1$ is larger than the absolute value of the second threshold $D_2$ ($|D_1|>|D_2|$). This is because the fuel temperature FT slowly increases after the start-up of the engine 10 after a sufficient soak time, even if the engine 10 has experienced a rapid cooling condition. The large absolute value of the first threshold $D_1$ enables the determination of a rapid cooling condition in view of the length of the soak time. The second threshold $D_2$ may be 0° C. This is because the drop in the fuel temperature FT after the start-up of the engine 10 indicates a high possibility that the engine 10 has experienced a rapid cooling condition and the soak time has not elapsed enough.

The first determining unit 4 performs the determination if the presuming unit 2 determines that the soak conditions are satisfied and if the second determining unit 3 determined that the large-difference conditions are satisfied (the small-difference conditions are not satisfied). The variation $D_{FF}$ in the fuel temperature FT is calculated within a first determination time. The variation $D_{FF}$ in the fuel temperature FT corresponds to the variation in the fuel temperature FT over time (the variation per unit time).

During the first determination time, the engine 10 is in operation, and preferably the vehicle is running. Preferably, the first determining unit 4 calculates the variation $D_{FF}$ in the fuel temperature FT of the running vehicle. For example, the first determining unit 4 determines a cumulative running time $T_{TRA}$ at a vehicle speed S equal to or higher than a criterial vehicle speed $S_0$. The first determining unit 4 continuously receives the information on the fuel temperature FT until the cumulative running time $T_{TRA}$ reaches or exceeds a fourth criterial time $T_4$ (the first determination time), and calculates the variation $D_{FF}$ in the fuel temperature FT after the start of the vehicle. The fourth criterial time $T_4$ can be determined as appropriate, and may be from several tens of seconds to several hundreds of seconds (300 to 600 seconds).

At this time, the intake temperature AT, the water temperature WT, and the oil temperature OT slowly increase as the cylinder block and the cylinder head are heated after the start-up of the engine 10. The fuel temperature FT varies, affected by the temperature of the cooled fuel in the fuel tank and the ambient temperature, at an insufficient soak time under a rapid cooling condition. The fuel temperature sensor 12 at the lower part of the fuel tank 17 detects a rapid rise in the fuel temperature FT after the start-up of the engine 10. The fuel temperature sensor 12 floating on the fuel surface detects a slow decrease in the fuel temperature FT even after the start-up of the engine 10. If a soak time has elapsed enough, the fuel temperature FT, which has substantially dropped to the ambient temperature, does not drop anymore and slowly increases as the entire vehicle is heated due to the start-up of the engine 10.

The variation $D_{FF}$ in the fuel temperature FT equal to or greater than the first threshold $D_1$ or less than the second threshold $D_2$ indicates that the engine 10 has started up at an insufficient soak time under a rapid cooling condition. This indicates that "the soak time has not actually elapsed enough" even if the soak conditions are satisfied. The first determining unit 4 determines the state of fault of the intake temperature sensor 11 to be unclear (the first determining unit 4 cannot determine whether the intake temperature sensor 11 is normal or not) if the variation $D_{FF}$ (the increment) in the fuel temperature FT is equal to or greater than the first threshold $D_1$ or the variation $D_{FF}$ (the decrement) in the fuel temperature FT is less than the second threshold $D_2$. The first determining unit 4 determines that a fault of the intake temperature sensor 11 is present if the variation $D_{FF}$ in the fuel temperature FT is equal to or greater than the second threshold $D_2$ and less than the first threshold $D_1$, which does not indicate that "the soak time has not actually elapsed enough".

If the fuel tank 17 has uneven fuel temperature FT in it, the fuel temperature FT at the fuel temperature sensor 12 may once slightly rise then drop after the start-up of the engine 10. For the determination of the decrement in the fuel temperature FT, the first determining unit 4 calculates the variation $D_{FF}$ (the decrement) in the fuel temperature FT from a temperature at which the fuel temperature FT starts to decrease. This enables the accurate determination of the decrement in the fuel temperature FT in a low temperature environment.

An example of actual fuel temperature variation conditions is as follows:

Condition 11: The variation $D_{FF}$ (the increment) in the fuel temperature FT is equal to or greater than the first threshold $D_1$.

Condition 12: The variation $D_{FF}$ (the decrement) in the fuel temperature FT is less than the second threshold $D_2$.

Condition 13: The variations $D_{FF}$ in conditions 11 and 12 are calculated while the vehicle is running.

Condition 14: The running of the vehicle in condition 13 is at a vehicle speed equal to or higher than the criterial vehicle speed $S_0$.

Either of conditions 11 and 12 of these conditions may be adopted depending on the position of the mounted fuel temperature sensor 12. Both conditions 11 and 12 may be adopted to the determination regardless of the position of the mounted fuel temperature sensor 12. Conditions 13 and 14 can be eliminated as appropriate.

The results determined by the diagnostic apparatus 5 are recorded in the diagnostic apparatus 5 as self-diagnostic data (dialogue information or dialogue codes) and are indicated on a display screen on an instrument panel or with an indicator such as a display lamp to notify the driver in the cabin.

The diagnostic results at the diagnostic apparatus 5 together with the determination conditions are shown in the following table 1.

TABLE 1

Conditions for and Results of Determination

| Conditions | | | |
|---|---|---|---|
| Soak | Large-Difference | Fuel Temperature Variation | Results |
| True | False | (Not Performed) | No Fault (Normal) |
| True | True | False | Fault |
| True | True | True | Unclear |
| False | (Not Performed) | (Not Performed) | Unclear |

The traditional diagnosis without referring to the variation $D_{FF}$ in the fuel temperature FT cannot determine whether the soak time has elapsed enough or not after the engine 10 has experienced a rapid cooling condition, which makes it difficult to discriminate the condition in the second row in the table 1 (Fault) from the condition in the third row (Unclear). The diagnostic apparatus 5 of the present invention can discriminate these conditions, which decreases a misdiagnosis and improves the diagnostic accuracy. The determination of the variation $D_{FF}$ in the fuel temperature FT in condition 11 or 12 enables the determination regardless of the position of the mounted fuel temperature sensor 12, which also improves the diagnostic accuracy.

[3. Flow Chart]
[3-1. Soak Conditions]

Figure 3:
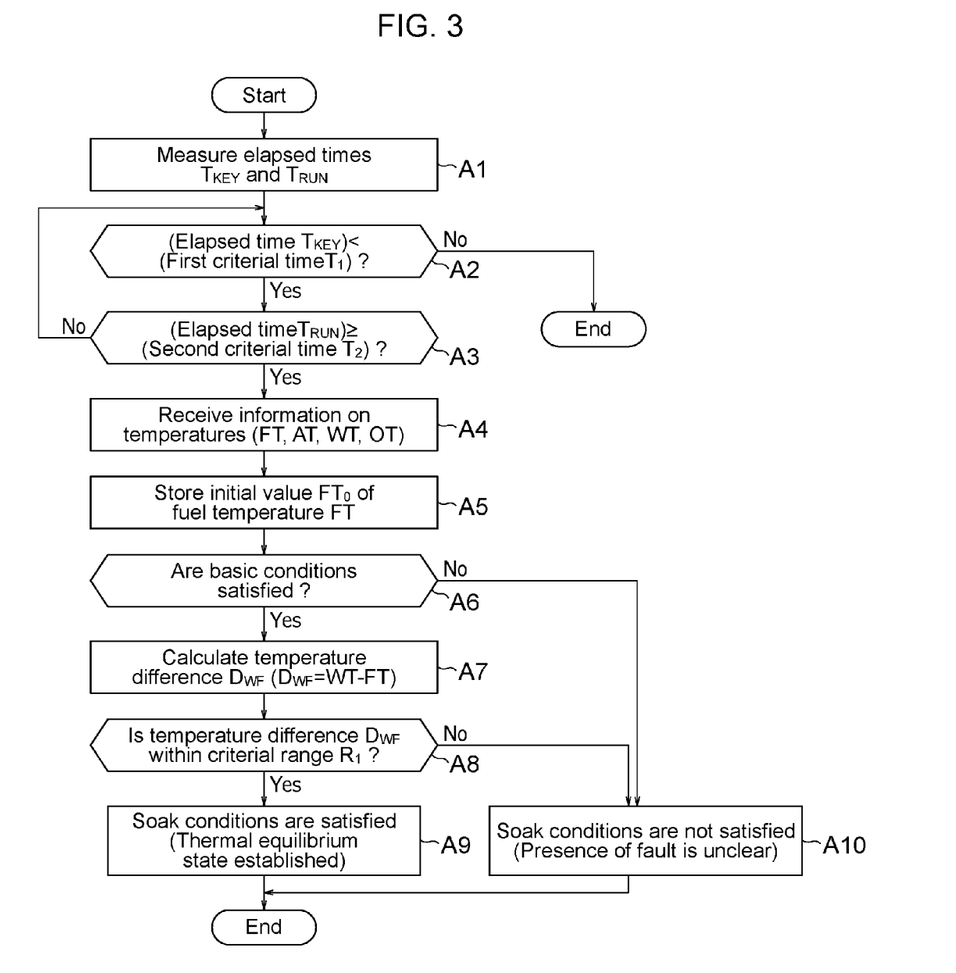
FIG. 3 is a flow chart illustrating the process for determining soak conditions.

FIG. 3 is a flow chart illustrating the process for determining soak conditions at the presuming unit 2. The process starts with switching of the IG switch 6 to the "on" position or the "ignition" position, for example, and the activation of the diagnostic apparatus 5.

In Step A1, the diagnostic apparatus 5 measures the elapsed time $T_{KEY}$ from the switching of the IG switch 6 to the "ignition" position, and the elapsed time $T_{RUN}$ from the start-up of the engine 10 with a built-in timer or counter.

In Step A2, the diagnostic apparatus 5 determines whether the elapsed time $T_{KEY}$ is shorter than the first criterial time $T_1$ or not. This step is related to condition 2. If the inequality "$T_{KEY} < T_1$" is true, the process goes to Step A3; otherwise, the process ends. This prevents the diagnosis from being performed after the first criterial time $T_1$.

In Step A3, the diagnostic apparatus 5 determines whether the elapsed time $T_{RUN}$ is equal to or longer than the second criterial time $T_2$ or not. This step is related to condition 3. If the inequality "$T_{RUN} \geq T_2$" is true, the process goes to Step A4; otherwise, the process returns to Step A2. This prevents the diagnosis from being performed until the second criterial time $T_2$ elapses after the start-up of the engine 10.

In Step A4, the diagnostic apparatus 5 receives the information on the temperatures measured at the temperature sensors 11 to 14. In this embodiment, the diagnostic apparatus 5 receives the information on the fuel temperature FT, the intake temperature AT measured at the intake temperature sensor 11 subject to the diagnosis, and the water temperature WT or the oil temperature OT (a second temperature) measured respectively at the water temperature sensor 13 or the oil temperature sensor 14 which is not subject to the diagnosis.

In Step A5, the diagnostic apparatus 5 stores the fuel temperature FT at the time as an initial value $FT_0$. The initial value $FT_0$ is used to calculate the variation $D_{FF}$ in the fuel temperature FT at the first determining unit 4. In Step A6, the diagnostic apparatus 5 determines whether the basic conditions are satisfied or not. This step is related to condition 1. If the basic conditions are satisfied, the process goes to Step A7; otherwise, the process goes to Step A10.

In Step A10, the diagnostic apparatus 5 determines that the soak conditions are not satisfied. In this case, the engine 10 is not determined to be in a thermal equilibrium state. The diagnostic apparatus 5 thus determines the state of fault of the intake temperature sensor 11 to be unclear (the diagnostic apparatus 5 cannot determine whether the intake temperature sensor 11 is normal or not), and then the process ends. In this case, the diagnostic process never starts until the time when the IG switch 6 is switched to the "OFF" and "ON" and the engine 10 starts up again.

In Step A7, the diagnostic apparatus 5 calculates the temperature difference $D_{WF}$ by subtracting the fuel temperature FT from the water temperature WT. In Step A8, the diagnostic apparatus 5 determines whether the temperature difference $D_{WF}$ is within the criterial range $R_1$ or not. If the inequality "$-10 \leq D_{WF} \leq +10$" is true, the process goes to Step A9; otherwise, the process goes to Step A10. In Step A9, the diagnostic apparatus 5 determines that the engine 10 is in a thermal equilibrium state and the soak conditions are satisfied. In this case, the second determining unit 3 performs the determination shown in FIG. 4.

[3-2. Large-Difference Conditions]

Figure 4:
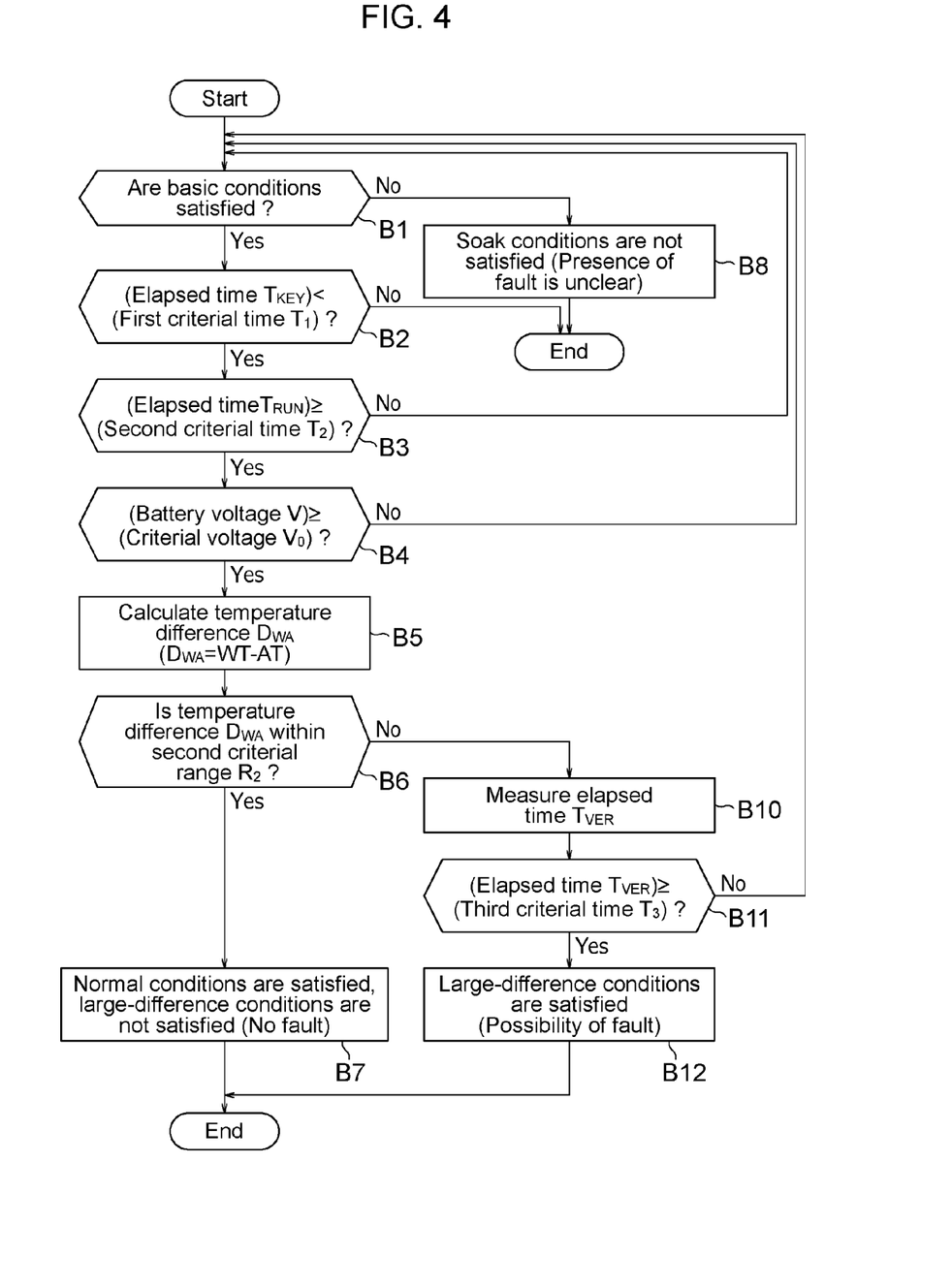
FIG. 4 is a flow chart illustrating the process for determining large-difference conditions.

FIG. 4 is a flow chart illustrating the process for determining the large-difference conditions at the second determining unit 3. This process is performed if the presuming unit 2 determines that the soak conditions are satisfied (if the process goes to Step A9 in FIG. 3).

In Step B1, the diagnostic apparatus 5 determines whether the basic conditions are satisfied or not. This step is related to condition 5. If the basic conditions are satisfied, the process goes to Step B2; otherwise, the process goes to Step B8.

In Step B8, the diagnostic apparatus 5 overrides the determination of the soak conditions in Step A9 in FIG. 3, and determines that the soak conditions are not satisfied, and then the process ends. Since the engine 10 in this case is not determined to be in a thermal equilibrium state, the diagnostic apparatus 5 determines the state of fault of the intake temperature sensor 11 to be unclear. In Step B2, the diagnostic apparatus 5 determines whether the elapsed time $T_{KEY}$ is shorter than the first criterial time $T_1$ or not. This step is related to condition 7. If "$T_{KEY} < T_1$" is true, the process goes to Step B3; otherwise, the process ends. This prevents the diagnosis from being performed after the first criterial time $T_1$.

In Step B3, the diagnostic apparatus 5 determines whether the elapsed time $T_{RUN}$ is equal to or longer than the second criterial time $T_2$ or not. This step is related to condition 8. If "$T_{RUN} \geq T_2$" is true, the process goes to Step B4; otherwise, the process returns to Step B1.

In Step B4, the diagnostic apparatus 5 determines whether the battery voltage V is equal to or higher than the criterial voltage $V_0$ or not. This step is related to condition 6. If "$V \geq V_0$" is true, the process goes to Step B5; otherwise, the process returns to Step B1.

In Step B5, the diagnostic apparatus 5 calculates the temperature difference $D_{WA}$ by subtracting the intake temperature AT from the water temperature WT. In Step B6, the diagnostic apparatus 5 determines whether the temperature difference $D_{WA}$ is within the second criterial range $R_2$ or not. If the inequality "$-15 \leq D_{WA} < +15$" is true, the process goes to Step B7; otherwise, the process goes to Step B10.

In Step B7, the diagnostic apparatus 5 determines that "the difference between the water temperature WT and the intake temperature AT is small (the large-difference conditions are not satisfied)". That is, the soak conditions are satisfied and the large-difference conditions are not satisfied. The diagnostic apparatus 5 determines that the intake temperature sensor 11 is normal (the intake temperature sensor 11 has no fault), and then the process ends.

In Step B10, the diagnostic apparatus 5 measures the elapsed time $T_{VER}$ with a built-in timer or counter to determine whether the temperature difference $D_{WA}$ remains outside the second criterial range $R_2$ or not.

In Step B11, the diagnostic apparatus 5 determines whether the elapsed time $T_{VER}$ is equal to or longer than the third criterial time $T_3$ or not. The third criterial time $T_3$ is several seconds, for example.

If "$T_{VER} \geq T_3$" is true, the process goes to Step B12, and the diagnostic apparatus 5 determines that "the difference between the water temperature WT and the intake temperature AT is large (the large-difference conditions are satisfied)". That is, both the soak conditions and the large-difference conditions are satisfied, and the first determining unit 4 starts to perform the determination shown in FIG. 5. If "$T_{VER} \geq T_3$" is false, the process returns to Step B1. If the temperature difference $D_{WA}$ reaches the second criterial range $R_2$ before the third criterial time $T_3$ elapses, the diagnostic apparatus 5 determines that the intake temperature sensor 11 is normal.

[3-3. Fuel Temperature Variation Conditions]

Figure 5:
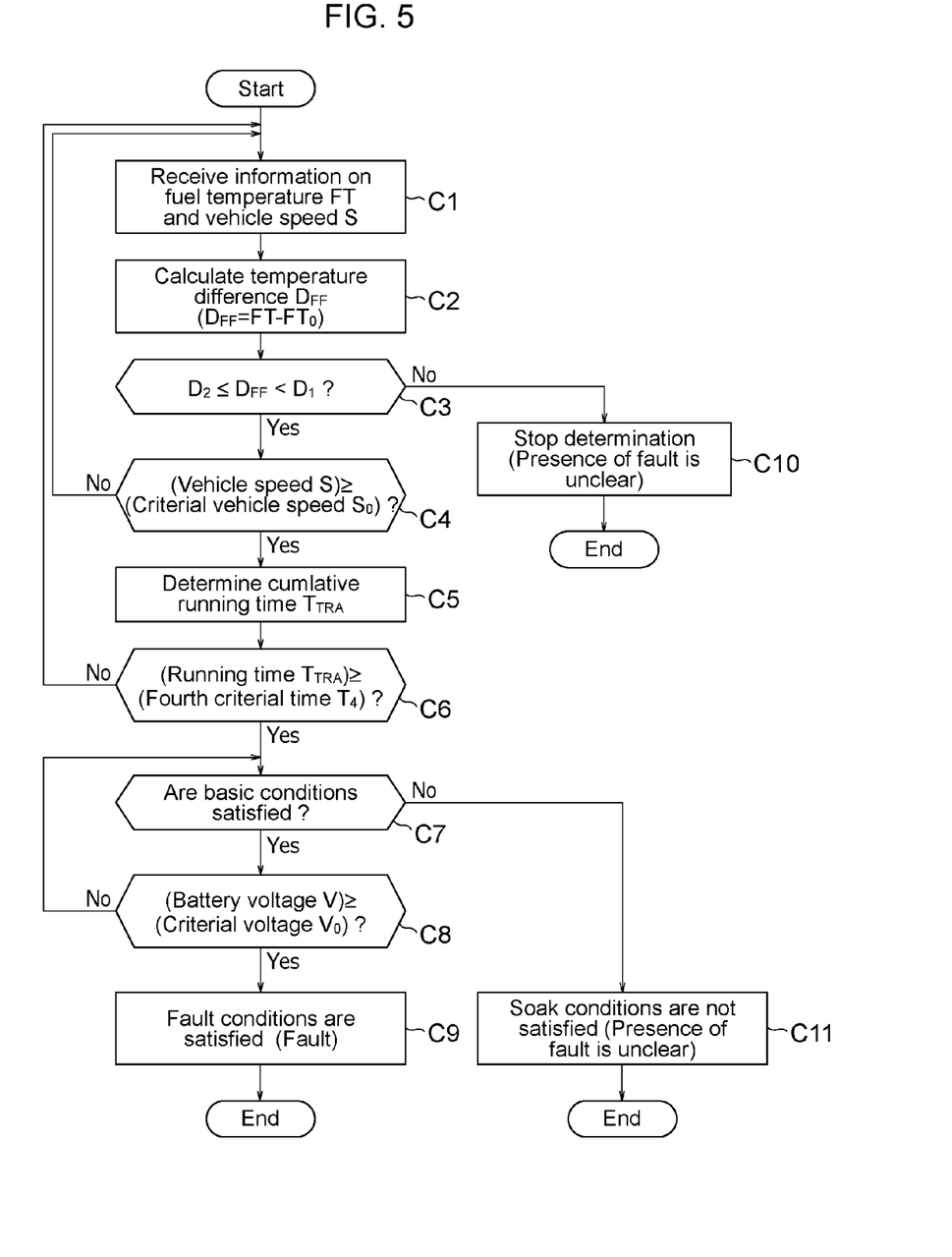
FIG. 5 is a flow chart illustrating the process for determining fuel temperature variation conditions.

FIG. 5 is a flow chart illustrating the process for determining the fuel temperature variation conditions at the first determining unit 4. This process is performed if the second determining unit 3 determines that the large-difference conditions are satisfied (if the process goes to Step B12 in FIG. 4).

In Step C1, the diagnostic apparatus 5 receives the information on the fuel temperature FT measured at the fuel temperature sensor 12 and the vehicle speed S measured at the vehicle speed sensor 7. In Step C2, the diagnostic apparatus 5 calculates the variation $D_{FF}$ in the fuel temperature FT based on (based at least in part on) the initial value $FT_0$ stored in Step A5 in FIG. 3 ($D_{FF} = FT - FT_0$). In Step C3, the diagnostic apparatus 5 determines whether the variation $D_{FF}$ is equal to or greater than the second threshold $D_2$, and less than the first threshold $D_1$. If "$D_2 \leq D_{FF} < D_1$" is false, the process goes to Step C10.

The condition under which "$D_2 \leq D_{FF} < D_1$" is false (that is, "$D_{FF} < D_2$" is true or "$D_{FF} \geq D_1$" is true) indicates a rapid rise or drop in the fuel temperature FT after the turn-on of the IG switch 6. In Step C10, the diagnostic apparatus 5 determines that the engine 10 starts up at an insufficient soak time under a rapid cooling condition, and the state of fault of the intake temperature sensor 11 to be unclear, and then the process ends.

In Step C3, if "$D_2 \leq D_{FF} < D_1$" is true, the process goes to Step C4. In Step C4, the diagnostic apparatus 5 determines whether the vehicle speed S is equal to or higher than the criterial vehicle speed $S_0$ or not. The criterial vehicle speed $S_0$ is a value indicating the running of the vehicle, preferably a value causing a certain wind during the running (40 km/h, for example). If "$S \geq S_0$" is true, the process goes to Step C5; otherwise, the process returns to Step C1.

In Step C5, the diagnostic apparatus 5 determine the cumulative running time $T_{TRA}$. The running time $T_{TRA}$ is a cumulative value at a vehicle speed equal to or higher than the criterial vehicle speed $S_0$. In Step C6, the diagnostic apparatus 5 determines whether the running time $T_{TRA}$ is equal to or longer than the fourth criterial time $T_4$ or not. If "$T \geq T_4$" is true, the process goes to Step C7; otherwise, the process returns to Step C1. Based on (based at least in part on) the determinations in Steps C1 to C6, even if the variation $D_{FF}$ is not equal to or greater than the first threshold $D_1$ or not less than the second threshold $D_2$, the diagnosis of the intake temperature sensor 11 is not performed before the vehicle runs at a certain speed for a certain time. If both "$D_{FF} < D_2$" and "$D_{FF} \geq D_1$" are false in the vehicle running at a certain speed for a certain time, the process goes to Step C7.

In Step C7, the diagnostic apparatus 5 determines again whether the basic conditions related to condition 5 are satisfied or not. If the basic conditions are satisfied, the process goes to Step C8; otherwise, the process goes to Step C11. In Step C11, the diagnostic apparatus 5 overrides the determination of the soak conditions in Step A9 in FIG. 3, and determines that the soak conditions are not satisfied, and then the process ends. Since the engine 10 in this case is not determined to be in a thermal equilibrium state, the diagnostic apparatus 5 determines the state of fault of the intake temperature sensor 11 to be unclear.

In Step C8, the diagnostic apparatus 5 determines the battery voltage condition related to condition 6. If the battery voltage V is equal to or higher than the criterial voltage $V_0$, the process goes to Step C9 in which the diagnostic apparatus 5 determines that a fault of the intake temperature sensor 11 is present, and then the process ends. In the entire flow from FIG. 3 to FIG. 5, Step C9 is the only step in which the diagnostic apparatus 5 determines that a fault of the intake temperature sensor 11 is present.

If the battery voltage V is lower than the criterial voltage $V_0$ in Step C8, the process returns to Step C7. If the basic conditions in this case are not satisfied before the battery voltage V reaches and exceeds the criterial voltage $V_0$, the process goes to Step C11 in which the diagnostic apparatus 5 determines the state of fault of the intake temperature sensor 11 to be unclear.

[4. Advantageous Effects]

Figure 6A:
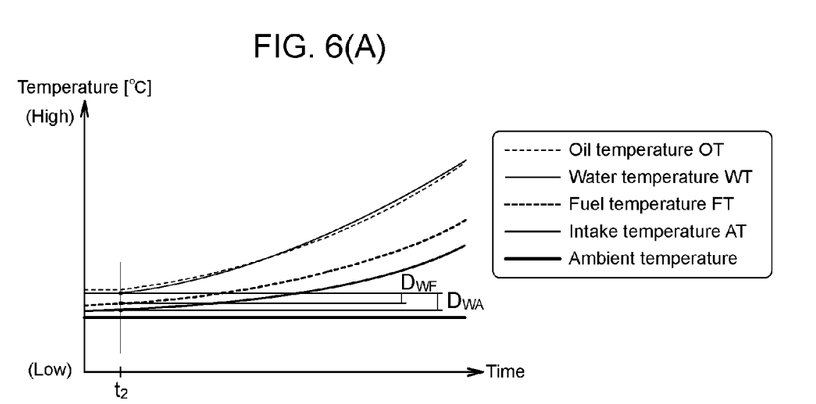
FIG. 6(A) is a graph indicating variations in temperatures at different sites over time after the start-up of the engine under a normal cooling condition.
Figure 6B:
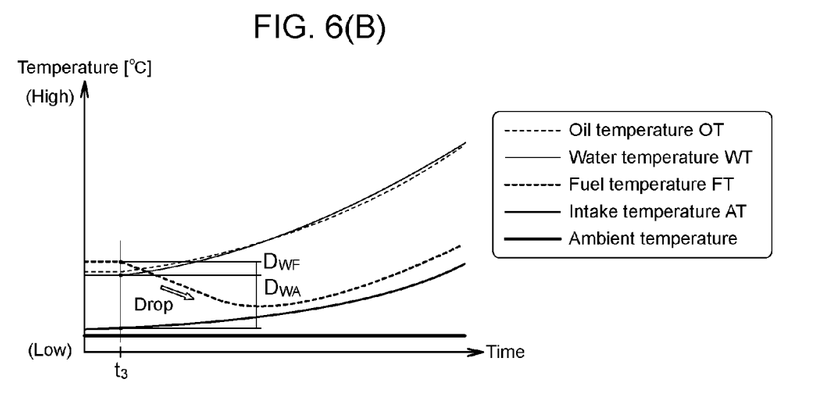
FIGS. 6(B) and 6(C) are graphs indicating variations in temperatures at different sites over time after the start-up of the engine under a rapid cooling condition.
Figure 6C:
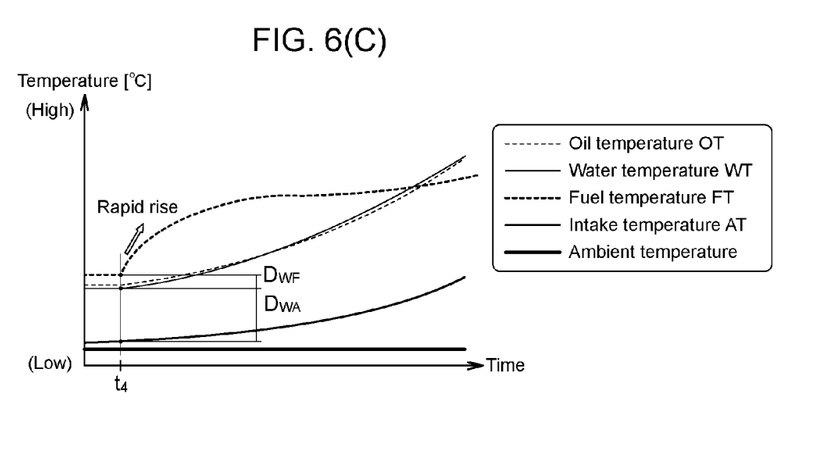

FIGS. 6(A) to 6(C) are graphs indicating variations in temperatures at different sites over time after the start-up of the engine 10. FIG. 6(A) is a graph under a normal cooling condition corresponding to that in FIG. 2(A). FIGS. 6(B) and 6(C) are graphs under a rapid cooling condition corresponding to that in FIG. 2(B).

If a soak time has elapsed enough under a normal cooling condition, the temperatures at different sites (the oil temperature OT, the water temperature WT, the fuel temperature FT, and the intake temperature AT) at the start-up of the engine 10 are relatively close to the ambient temperature as shown in FIG. 6(A). At a time t2 after the start-up of the engine 10, if the soak conditions are satisfied (For example, the inequality "$-10 \leq D_{WF} \geq +10$" is true) and if the large-difference conditions are not satisfied (For example, the inequality "$-15 \leq D_{WA} \leq +15$" is true), the intake temperature sensor 11 is determined to be normal.

If a soak time has not elapsed enough under a rapid cooling condition, some of the temperatures at different sites (the oil temperature OT, the water temperature WT, and the fuel temperature FT) may not be close to the ambient temperature at the start-up of the engine 10, as shown in FIG. 6(B). The float-type fuel temperature sensor 12 detects the rises in the intake temperature AT, the oil temperature OT, and the water temperature WT immediately after the start-up of the engine 10, while the sensor 12 detects the drop in the fuel temperature FT close to the ambient temperature even after the start-up of the engine 10.

In consideration of this tendency, by reference to the variation $D_{FF}$ (the decrement) in the fuel temperature FT at a time t3 after the start-up of the engine 10, the diagnostic apparatus 5 determines whether the actual soak time is sufficient or not even if the soak conditions are satisfied (For example, the inequality "$-10 \leq D_{WF} \leq +10$" is true). If the actual soak time is insufficient, the diagnostic apparatus 5 determines the state of fault of the intake temperature sensor 11 to be unclear due to the low reliability of the determination of the soak conditions and the determination of the large-difference condition.

The fuel temperature sensor 12 fixed to the lower part of the fuel tank 17 detects a rapid rise in the fuel temperature FT after the start-up of the engine 10 as shown in FIG. 6(C) because the fuel layers with different temperatures are agitated in the fuel tank 17. By reference to the variation $D_{FF}$ (the increment) in the fuel temperature FT at a time t4 also in this case, the diagnostic apparatus 5 determines whether the actual soak time is sufficient or not even if the soak conditions are satisfied (For example, the inequality "$-10 \leq D_{WF} + \leq 10$" is true).

(1) As described above, the first determining unit 4 of the diagnostic apparatus 5 determines whether the state of fault of the intake temperature sensor 11 is unclear or not based on (based at least in part on) the variation $D_{FF}$ in the fuel temperature FT after the start-up of the engine 10 for the diagnosis at the diagnostic unit 1. The reference to the variation $D_{FF}$ in the fuel temperature FT prevents a misdiagnosis of the intake temperature sensor 11 at the start-up under a rapid cooling condition shown in FIGS. 6(B) and 6(C). That is, the diagnostic apparatus 5 discriminates between the condition under which a fault of the target temperature sensor is actually present and the condition under which the state of fault of the target temperature sensor is unclear, which improves the diagnostic accuracy.

(2) After the soak conditions and the large-difference conditions are satisfied, if the variation $D_{FF}$ in the fuel temperature FT is positive, in other words, if the fuel temperature FT rises after the start-up of the engine 10, a variation $D_{FF}$ (a positive value) equal to or greater than the first positive threshold $D_1$ indicates the state of fault of the intake temperature sensor 11 to be unclear. If the variation $D_{FF}$ (the increment) is less than the first threshold $D_1$, the diagnostic apparatus 5 determines that a fault of the intake temperature sensor 11 is present. Through comparison of the variation $D_{FF}$ (the increment) with the first threshold $D_1$, the diagnostic apparatus 5 quantitatively evaluates the variation $D_{FF}$ in the fuel temperature FT over time, determines the accurate actual soak time, and thus improves the diagnostic accuracy.

(3) In the process shown in FIGS. 3 to 5 (in Step A3 and Step C6), the diagnostic apparatus 5 calculates the variation $D_{FF}$ (the increment) in the fuel temperature FT after the elapsed time $T_{RUN}$ after the start-up of the engine 10 reaches and exceeds the second criterial time $T_2$ until the running time $T_{TRA}$ reaches and exceeds the fourth criterial time $T_4$. Determination of the variation $D_{FF}$ (the increment) in the fourth criterial time $T_4$ in this way allows the diagnostic apparatus 5 to accurately observe the uniformalization of the fuel temperature FT in the fuel tank 17. This can accurately determine the uneven fuel temperature FT in the fuel tank 17 and improves the diagnostic accuracy.

(4) After the soak conditions and the large-difference conditions are satisfied, if the variation $D_{FF}$ in the fuel temperature FT is negative, in other words, if the fuel temperature FT drops after the start-up of the engine 10, a variation $D_{FF}$ (a negative value) less than the second negative threshold $D_2$ indicates the state of fault of the intake temperature sensor 11 to be unclear. If the variation $D_{FF}$ (the decrement) is equal to or greater than the second threshold $D_2$, the diagnostic apparatus 5 determines that a fault of the intake temperature sensor 11 is present. Through comparison of the variation $D_{FF}$ (the decrement) with the second threshold $D_2$, the diagnostic apparatus 5 quantitatively evaluates the variation $D_{FF}$ in the fuel temperature FT over time, determines the accurate actual soak time, and thus improves the diagnostic accuracy.

(5) If the fuel tank 17 has uneven fuel temperature FT in it, the fuel temperature FT may once slightly rise then drop after the start-up of the engine 10. Calculation of the variation $D_{FF}$ (the decrement) in the fuel temperature FT from a temperature at which the fuel temperature FT starts to decrease allows the diagnostic apparatus 5 to determine the accurate decrement in the fuel temperature FT in a low temperature environment and to improve the diagnostic accuracy. The diagnostic apparatus 5 eliminates the effects by the difference in the fuel temperature FT in the fuel tank 17, and improves the diagnostic accuracy.

(6) The first determining unit 4 calculates the variation $D_{FF}$ in the fuel temperature FT of the running vehicle and compares the variation $D_{FF}$ with the first threshold $D_1$ and the second threshold $D_2$. By reference to the variation $D_{FF}$ of the running vehicle, as shown in FIGS. 6(B) and 6(C), the diagnostic apparatus 5 accurately discriminates the variation $D_{FF}$ in the fuel temperature FT from the variations in the other temperatures (the intake temperature AT, the oil temperature OT, and the water temperature WT). In other words, the diagnostic apparatus 5 determines the accurate operational condition of the engine 10 with the dropping fuel temperature FT and the other rising temperatures, and improves the diagnostic accuracy.

(7) The first determining unit 4 calculates the variation $D_{FF}$ at a vehicle speed S equal to or higher than the criterial vehicle speed $S_0$ until the cumulative running time $T_{TRA}$ reaches the fourth criterial time $T_4$. In other words, the diagnostic results are not determined before the cumulative running time $T_{TRA}$ reaches the fourth criterial time 14. This gives a time for the diagnosis of the target temperature sensor and prevents a misdiagnosis. The diagnostic apparatus 5 thus improves the diagnostic accuracy.

(8) The diagnostic apparatus 5 adopts the determination at the first determining unit 4 if the presuming unit 2 determines that the soak conditions are satisfied. For example, if the soak conditions are not satisfied, the diagnostic apparatus 5 immediately determines the state of fault of the target temperature sensor to be unclear (the diagnostic apparatus 5 cannot determine whether the target temperature sensor is normal or not). The diagnostic apparatus 5 does not refer to the variation $D_{FF}$ in the fuel temperature FT while the engine 10 is not in a thermal equilibrium state. This prevents the misdiagnosis based on (based at least in part on) the results at the first determining unit 4, and improves the diagnostic accuracy. If it is not necessary to refer to the variation $D_{FF}$ in the fuel temperature FT, the overall calculation load can be reduced in the diagnostic apparatus 5 by eliminating the calculation at the first determining unit 4.

(9) The presuming unit 2 determines that the engine 10 is in a thermal equilibrium state if the difference $D_{WF}$ between the water temperature WT and the fuel temperature FT is within the criterial range $R_1$. This eliminates the calculation of the soak time during the shut-off time with a soak timer, and simplifies the structure of the apparatus.

(10) The second determining unit 3 calculates the difference between the intake temperature AT measured at the target intake temperature sensor 11 and any other temperature measured at any other sensor, and determines the difference. The diagnostic apparatus 5 adopts the determination at the first determining unit 4 if the second determining unit 3 determines that the large-difference conditions are satisfied. If the large-difference conditions are not satisfied, the diagnostic apparatus 5 do not refer to the variation $D_{FF}$ in the fuel temperature FT. This prevents the misdiagnosis based on (based at least in part on) the results at the first determining unit 4, and improves the diagnostic accuracy. If it is not necessary to refer to the variation $D_{FF}$ in the fuel temperature FT, the overall calculation load can be reduced in the diagnostic apparatus 5 by eliminating the calculation at the first determining unit 4.

(11) The second determining unit 3 determines that the large-difference conditions are satisfied, if the temperature difference $D_{WA}$ is outside the second criterial range $R_2$ when the elapsed time $T_{VER}$ reaches and exceeds the third criterial time $T_3$, as shown in conditions 9 and 10. This gives a time for the diagnosis of the target temperature sensor, prevents a misdiagnosis, and improves the diagnostic accuracy.

[5. Modification]

The above embodiment may be modified in various manners within the scope of the invention. The elements of the present embodiment can be combined in any form as appropriate, and some of the elements may be omitted. Alternatively these elements may be combined with any other element. For example, the above fuel temperature FT may be an actual value measured with the fuel temperature sensor 12 or a value calculated based on (based at least in part on) the information on the temperatures. Use of the calculated fuel temperature FT eliminates the fuel temperature sensor 12. A specific method of calculating the fuel temperature FT may be a known method of calculating the fuel temperature FT based on (based at least in part on) the ambient temperature, the water temperature WT, the fuel pressure, the volume of the injected fuel, and the combustion condition of the engine 10.

In the above embodiment, the fuel temperature FT is stored as the initial value $FT_0$ when the elapsed time $T_{RUN}$ after the start-up of the engine reaches and exceeds the second criterial time $T_2$ for determining the variation $D_{FF}$ in the fuel temperature FT, as shown in Step A5 in FIG. 3. The initial value $FT_0$ is merely a reference value for calculating the variation $D_{FF}$ for determining the decrement in the fuel temperature FT, and not necessarily stored at this time.

The time for storing the initial value $FT_0$ may be the time for the turn-on of the IG switch 6, the time for the start-up of the engine 10, or the time after the large-difference conditions are satisfied. In any case, the diagnostic apparatus 5 determines the state of fault of the target temperature sensor to be unclear if the decrement in the fuel temperature is equal to or greater than the criterial value, and determines that a fault of the target temperature sensor is present if the decrement is less than the criterial value. Such criteria provide a similar advantageous effect to the above embodiment.

In the above embodiment, the diagnostic apparatus 5 determines whether the state of fault of the intake temperature sensor 11 is unclear or not based on (based at least in part on) the variation $D_{FF}$ in the fuel temperature FT. Instead of the variation $D_{FF}$, the drop rate (that is, the variation per unit time) may be adopted. For example, the fuel temperature FT is measured at every criterial cycle, and the cyclic variation in the fuel temperature FT is calculated as the drop rate. The diagnostic apparatus 5 determines the state of fault of the intake temperature sensor 11 to be unclear if the drop rate is equal to or higher than a criterial rate (the drop is steep). Such a process provides a similar advantageous effect to the above embodiment.

In the above embodiment, the diagnostic apparatus 5 diagnoses the intake temperature sensor 11. The target temperature sensor is not limited to the intake temperature sensor 11. The diagnostic apparatus 5 may diagnose any temperature sensor measuring a temperature of an object related to the engine 10 other than the fuel temperature sensor 12. For example, the diagnostic apparatus 5 may diagnose the water temperature sensor 13 and the oil temperature sensor 14. "The temperature of an object related to the engine 10" includes the intake temperature, the engine cooling water temperature, the engine oil temperature, the engine room temperature, the cylinder block temperature, and the cylinder head temperature.

In the above embodiment, the diagnostic apparatus 5 diagnoses the intake temperature sensor 11 mainly based on (based at least in part on) the three temperatures: the intake temperature AT, the fuel temperature FT, and the water temperature WT. The water temperature WT may be replaced by the oil temperature OT. For example, if the water temperature sensor 13 is subject to the diagnosis, the soak conditions may include the condition under which the temperature difference $D_{OF}$ calculated by subtracting the fuel temperature FT from the oil temperature OT is within the criterial range $R_1$, or the condition under which the temperature difference $D_{AF}$ calculated by subtracting the fuel temperature FT from the intake temperature AT is within the criterial range $R_1$.

The invention thus described, it will be obvious that the same may be varied in many ways. Such variations are not to be regarded as a departure from the scope of the invention, and all such modifications as would be obvious to one skilled in the art are intended to be included within the scope of the following claims.

REFERENCE SIGNS LIST

1 diagnostic unit
2 presuming unit (thermal equilibrium state presuming unit)
3 second determining unit (difference determining unit)
4 first determining unit (fuel temperature referencing unit)
5 diagnostic apparatus
6 IG switch
7 vehicle speed sensor
8 voltage sensor
10 engine
11 intake temperature sensor (first temperature sensor, second temperature sensor)

12 fuel temperature sensor
13 water temperature sensor (first temperature sensor, second temperature sensor)
14 oil temperature sensor (first temperature sensor, second temperature sensor)
15 intake passage
16 fuel passage
17 fuel tank

The invention claimed is:

1. A diagnostic apparatus for a temperature sensor mounted in a vehicle, comprising:
   a first temperature sensor measuring a first temperature of an object related to an engine in the vehicle;
   a fuel temperature sensor measuring a fuel temperature in the vehicle, the fuel temperature being different from the first temperature;
   a diagnostic unit diagnosing the first temperature sensor based at least in part on the first temperature measured at the first temperature sensor at a start-up of the engine; and
   a first determining unit determining whether the state of fault of the first temperature sensor is unclear or not based at least in part on whether a difference between an initial fuel temperature measured by the fuel temperature sensor at a start-up of the engine and a fuel temperature measured by the fuel temperature sensor after the start-up of the engine is within a predetermined range for the diagnosis at the diagnostic unit.

2. The diagnostic apparatus for a temperature sensor according to claim 1, wherein
   the first determining unit determines the state of fault of the first temperature sensor to be unclear if an increment in the fuel temperature is equal to or greater than a first threshold, and determines that a fault of the first temperature sensor is present if the increment in the fuel temperature is less than the first threshold.

3. The diagnostic apparatus for a temperature sensor according to claim 2, wherein
   the first determining unit calculates the increment in the fuel temperature until an elapsed time after the start-up of the engine reaches a first determination time.

4. The diagnostic apparatus for a temperature sensor according to claim 1, wherein
   the first determining unit determines the state of fault of the first temperature sensor to be unclear if a decrement in the fuel temperature is less than a second threshold, and determines that a fault of the first temperature sensor is present if the decrement in the fuel temperature is equal to or greater than the second threshold.

5. The diagnostic apparatus for a temperature sensor according to claim 2, wherein
   the first determining unit determines the state of fault of the first temperature sensor to be unclear if a decrement in the fuel temperature is less than a second threshold, and determines that a fault of the first temperature sensor is present if the decrement in the fuel temperature is equal to or greater than the second threshold.

6. The diagnostic apparatus for a temperature sensor according to claim 3, wherein
   the first determining unit determines the state of fault of the first temperature sensor to be unclear if a decrement in the fuel temperature is less than a second threshold, and determines that a fault of the first temperature sensor is present if the decrement in the fuel temperature is equal to or greater than the second threshold.

7. The diagnostic apparatus for a temperature sensor according to claim 4, wherein
   the first determining unit calculates the decrement in the fuel temperature from a temperature at which the fuel temperature starts to decrease.

8. The diagnostic apparatus for a temperature sensor according to claim 5, wherein
   the first determining unit calculates the decrement in the fuel temperature from a temperature at which the fuel temperature starts to decrease.

9. The diagnostic apparatus for a temperature sensor according to claim 6, wherein
   the first determining unit calculates the decrement in the fuel temperature from a temperature at which the fuel temperature starts to decrease.

10. The diagnostic apparatus for a temperature sensor according to claim 1, wherein
    the first determining unit calculates the variation in the fuel temperature while the vehicle is running.

11. The diagnostic apparatus for a temperature sensor according to claim 10, wherein
    the first determining unit calculates the variation in the fuel temperature at a vehicle speed equal to or higher than a criterial vehicle speed until a cumulative running time reaches a criterial time.

12. The diagnostic apparatus for a temperature sensor according to claim 1, comprising:
    a presuming unit estimating a thermal equilibrium state in the engine, wherein
    the first determining unit determines the state of fault of the first temperature sensor based at least in part on the variation in the fuel temperature if the presuming unit determines that the engine is in a thermal equilibrium state.

13. The diagnostic apparatus for a temperature sensor according to claim 12, wherein
    the presuming unit determines that the engine is in a thermal equilibrium state if a difference between a temperature of cooling water for the engine and the fuel temperature is within a criterial range.

14. The diagnostic apparatus for a temperature sensor further according to claim 1, comprising:
    a second temperature sensor measuring a second temperature of another object related to the engine, the second temperature being different from the first temperature and the fuel temperature; and
    a second determining unit determining a difference between the first temperature measured at the first temperature sensor and the second temperature measured at the second temperature sensor, wherein
    the first determining unit determines the state of fault of the first temperature sensor based at least in part on the variation in the fuel temperature if the second determining unit determines that the difference is outside a criterial range.

15. The diagnostic apparatus for a temperature sensor according to claim 14, wherein
    the first determining unit determines the state of fault of the first temperature sensor based at least in part on the variation in the fuel temperature if the second determining unit determines that the difference remains outside the criterial range for a second determination time or more.

16. The diagnostic apparatus for a temperature sensor according to claim 5, wherein
    the first threshold is set larger than the second threshold.

* * * * *